United States Patent
Kwon et al.

(10) Patent No.: US 10,367,209 B2
(45) Date of Patent: Jul. 30, 2019

(54) RECYCLING SYSTEM OF ANODE OFF GAS IN FUEL CELL

(71) Applicant: Hyundai Motor Company, Seoul (KR)

(72) Inventors: Bu Kil Kwon, Gyeonggi-do (KR); Duck Whan Kim, Gyeonggi-do (KR); Se Kwon Jung, Seoul (KR); Ik Jae Son, Gyeonggi-do (KR); Hyo Sub Shim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 297 days.

(21) Appl. No.: 15/368,481

(22) Filed: Dec. 2, 2016

(65) Prior Publication Data
US 2018/0026278 A1    Jan. 25, 2018

(30) Foreign Application Priority Data
Jul. 22, 2016 (KR) .......... 10-2016-0093244

(51) Int. Cl.
*H01M 8/04089* (2016.01)
*H01M 8/04223* (2016.01)
*H01M 8/04082* (2016.01)

(52) U.S. Cl.
CPC ... *H01M 8/04097* (2013.01); *H01M 8/04201* (2013.01); *H01M 8/04231* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 8,647,782 B2 * | 2/2014 | Wake | H01M 8/04 429/400 |
| 8,962,204 B2 * | 2/2015 | Yonekura | H01M 8/04014 429/415 |
| 9,112,198 B2 * | 8/2015 | Yang | H01M 8/04156 |
| 9,595,725 B2 * | 3/2017 | Mathie | H01M 8/04708 |
| 2003/0148167 A1 | 8/2003 | Sugawara et al. | |
| 2005/0244686 A1 | 11/2005 | Kamihara | |
| 2010/0209818 A1 | 8/2010 | Fukuma et al. | |
| 2010/0297518 A1 | 11/2010 | Wake et al. | |
| 2015/0125766 A1 * | 5/2015 | Forte | H01M 8/0485 429/414 |

FOREIGN PATENT DOCUMENTS

| | | |
|---|---|---|
| JP | 2004-111268 A | 4/2004 |
| JP | 2007-149423 A | 6/2007 |
| JP | 2008-192514 A | 8/2008 |
| KR | 10-1610126 B1 | 4/2016 |

* cited by examiner

*Primary Examiner* — Rena Dye Cronin
(74) *Attorney, Agent, or Firm* — Mintz Levin Cohn Ferris Glovsky and Popeo, P.C.; Peter F. Corless (57) ABSTRACT

A recycling system in which anode off gas of a fuel cell is recycled to a stack includes a purge flow path purging the anode off gas passing through the stack, and a sprayer spraying pure gas supplied from a fuel tank to the stack. The sprayer is disposed on a path where the anode off gas passing through the stack is discharged, the purge flow path is spaced a certain distance from the sprayer, and the anode off gas passing through the stack is mixed with the pure gas by suction force of the sprayer to be introduced to the stack, thereby being recycled.

4 Claims, 6 Drawing Sheets

RECYCLING SYSTEM OF ANODE OFF GAS IN FUEL CELL

CROSS-REFERENCE TO RELATED APPLICATION

This application claims under 35 U.S.C. § 119(a) the benefit of Korean Patent Application No. 10-2016-0093244, filed on Jul. 22, 2016 in the Korean Intellectual Property Office, the entire contents of which are incorporated herein by reference.

BACKGROUND

1. Technical Field

The present disclosure relates to a recycling system of anode off gas, and more particularly, to a recycling system of anode off gas in which a distance is adjusted between a nozzle of an ejector and a purge flow path where gas is discharged from an anode, and some gas discharged from the anode is mixed with pure gas supplied from a fuel tank by suction force of the ejector to be recycled to the stack.

2. Description of the Related Art

In general, a fuel cell system includes a fuel cell stack generating electrical energy, a fuel supply system supplying fuel (hydrogen) to the fuel cell stack, an air supply system supplying oxygen, that is, an oxidizer which is necessary for an electrochemical reaction, and a heat and water control system controlling an operating temperature of the fuel cell stack.

The fuel supply system, namely, a hydrogen tank of a hydrogen supply system stores high-pressure compressed hydrogen of about 700 bar. After the stored compressed hydrogen is discharged through a high-pressure line according to an on/off state of a high-pressure controller mounted at an inlet of the hydrogen tank, the compressed hydrogen is decompressed through a starting valve and a hydrogen supply valve to supply the fuel cell stack.

After hydrogen supplied to the stack performs a reaction for generation of electricity, some hydrogen is recycled to an anode and the remaining hydrogen is discharged via a purge valve, namely, a hydrogen purge is performed. When purging hydrogen, some hydrogen discharged from the stack is recycled to the anode of the stack and the remaining hydrogen is discharged through the purge valve.

Further, periodic purge of the anode of the fuel cell stack is performed to discharge nitrogen or water accumulated at the anode. Namely, since nitrogen and water accumulated at the anode of the stack cause performance of the stack to be deteriorated during operation of the fuel cell stack in a fuel cell vehicle, concentration of hydrogen is maintained at a certain level or more by periodic purge of the anode to secure stable performance of the stack.

Upon purging, the purging amount depends on a pressure difference between pressure of a hydrogen outlet and pressure of an air outlet, and an open time of a valve. Further, as output of the fuel cell system is increased, the amount of supplied air and hydrogen is increased to purge large amounts of anode off gas during opening of the purge valve in a high-output case as compared to a low-output case.

Figure 1:
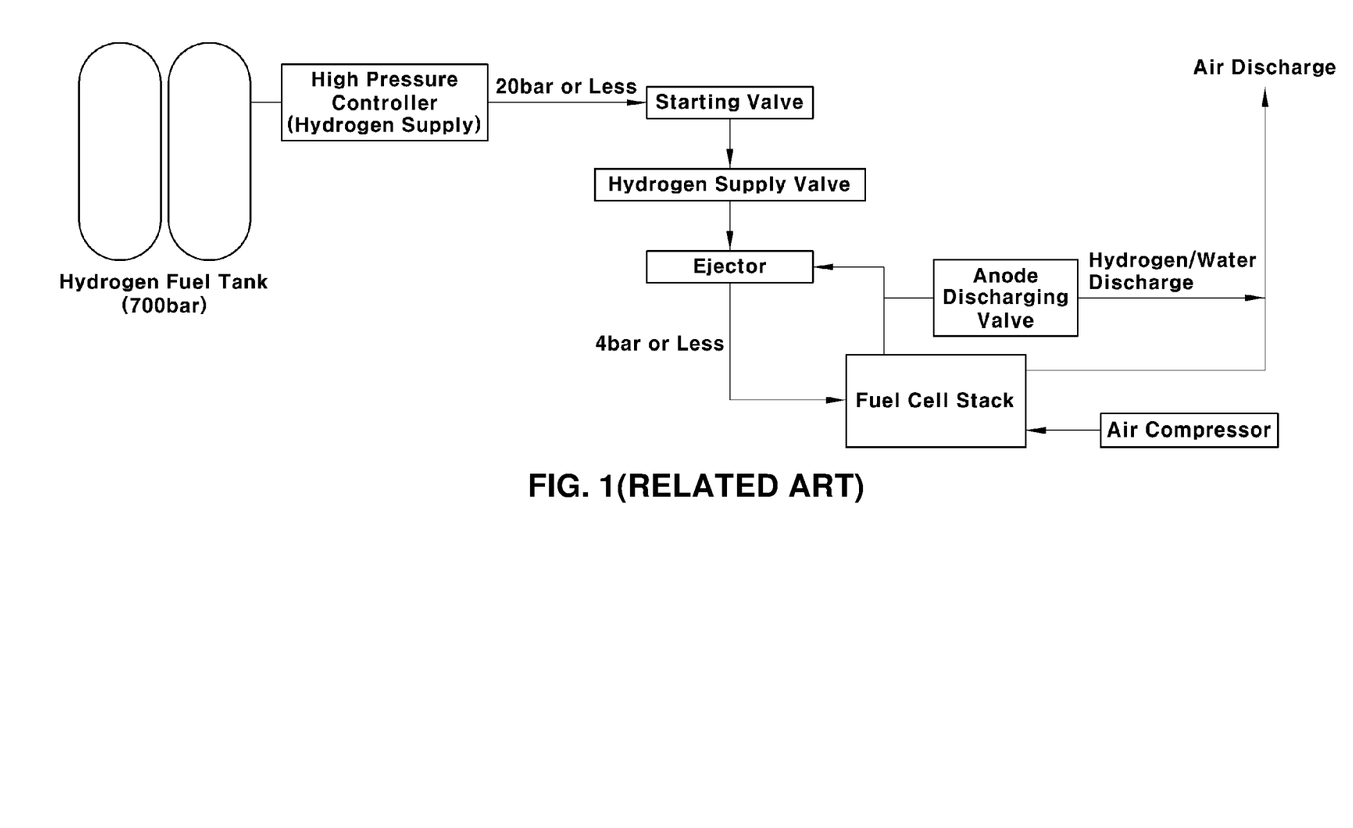
FIG. 1 (RELATED ART) is a view illustrating a general configuration and a connection diagram of a fuel cell system.
Figure 2:
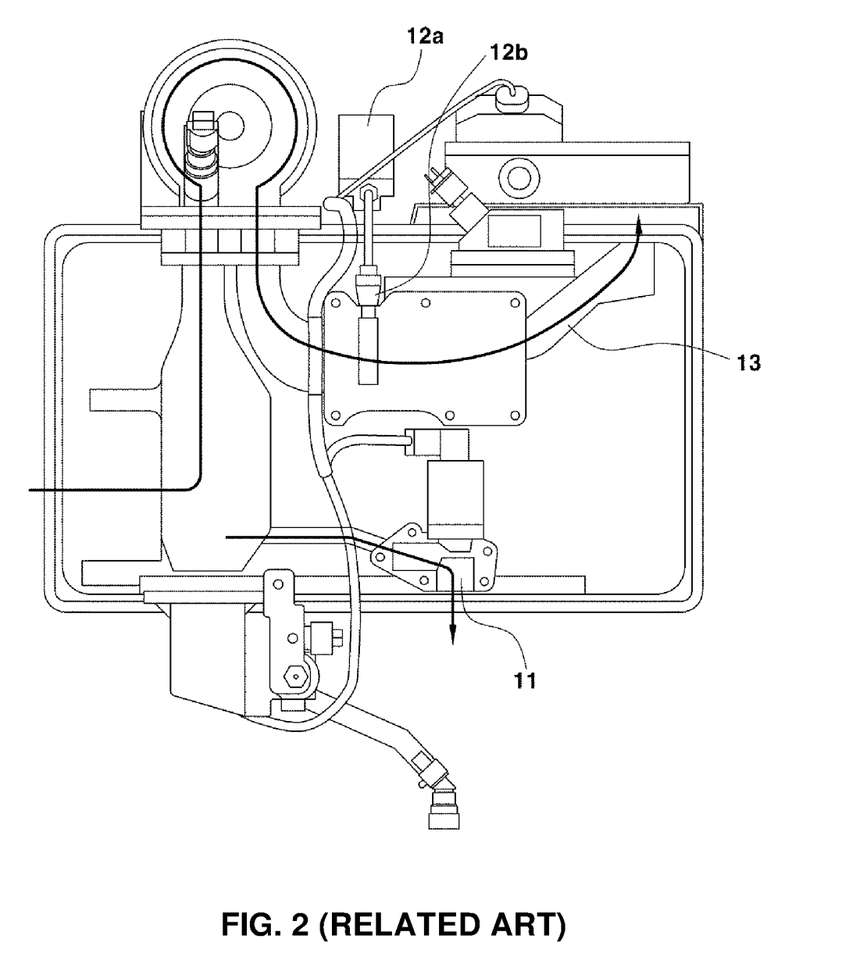
FIG. 2 (RELATED ART) is a view illustrating a conventional recycling system of anode off gas.

In a conventional configuration for recycling and purging hydrogen, as shown in FIGS. 1 and 2 (RELATED ART), a purge valve is disposed at a lower end of a stack manifold. Namely, a distance between an ejector and a purge flow path is large. As the distance therebetween increases, excess anode off gas is unnecessarily purged in the case of high output, thereby decreasing fuel efficiency.

SUMMARY

Therefore, the present disclosure has been made in view of the above problems, and it is an object of the present disclosure to provide a recycling system for anode off gas in which a purge flow path is disposed adjacent to a nozzle of an ejector such that the amount of purged gas is adjusted by suction force of the ejector, thereby decreasing the amount of the anode off gas which is unnecessarily purged from the anode of the stack.

In accordance with one aspect of the present disclosure, the above and other objects can be accomplished by the provision of a recycling system of anode off gas in which the anode off gas of a fuel cell is recycled to a stack including a purge flow path purging the anode off gas passing through the stack, and a sprayer spraying pure gas supplied from a fuel tank to the stack, wherein the sprayer is disposed on a path where the anode off gas passing through the stack is discharged, the purge flow path is spaced a certain distance from the sprayer, and the anode off gas passing through the stack is mixed with the pure gas by suction force of the sprayer to be introduced to the stack, thereby being recycled.

In a preferred embodiment, the sprayer may include a nozzle formed at an end of the sprayer in a direction which extends toward the stack.

In another preferred embodiment, the purge flow path may be disposed above a position where the pure gas is sprayed from the sprayer.

In still another preferred embodiment, the purge flow path may be parallel to a supply line spraying the pure gas from the sprayer to the stack.

In yet another preferred embodiment, the certain distance may be 20 mm to 60 mm.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an example embodiment of the present disclosure will be described in detail with reference to accompanying drawings. The present disclosure includes various applications and modifications and is not limited to the following embodiments. The embodiments will make the disclosure of the present disclosure complete, and allow those skilled in the art to completely comprehend the scope of the present disclosure.

FIG. 1 (RELATED ART) is a view schematically illustrating a configuration of a fuel cell system mounted at a vehicle. The fuel cell system mainly includes a fuel cell stack generating electrical energy, a fuel tank supplying fuel (hydrogen) to the fuel cell stack, an air supply unit storing oxygen serving as an oxidizer which is necessary for electrochemical reaction at the fuel cell stack, a discharge valve removing by-products generated after reaction at the stack, and a cooling system radiating reaction heat of the fuel cell stack to outside the system while controlling an operation temperature of the fuel cell stack.

The recycling system of anode off gas in the present disclosure means a "system" including an outlet of an anode of a fuel cell system, an inner space of a stack manifold block for discharging gas passing through the anode, a water drain discharging generated water, a sprayer 12 supplying pure gas supplied from a fuel tank, a purge flow path 11 discharging some gas passing through the anode, a purge valve, and a supply line 13 in which pure gas supplied from the fuel tank is mixed with some gas passing through the anode to be supplied to the stack. According to the illustrated embodiment of the present disclosure, pure gas serving as fuel may include hydrogen. An ejector 12a including a nozzle 12b may be used for the sprayer 12. The ejector 12a functions to supply pure gas supplied from the fuel tank to the stack. In particular, the nozzle formed at an end of the ejector 12a extending toward the stack may spray pure gas to the supply line 13 connected to the stack. As output of the fuel cell system is increased, the amount of supplied gas may be increased and a pressure of gas supplied to the stack through the nozzle 12b of the ejector 12a may be increased. In addition, as gas is sucked at the supply line 13 connected to the stack by high pressure, suction force adjacent to the nozzle 12b may be increased by the ejector 12a. Namely, a part of the inner space of the stack manifold block which surrounds the nozzle 12b may form a relatively "low pressure area".

Hereinafter, the meaning of "low pressure area" in the present disclosure will be explained in comparison with the conventional case. The conventional recycling flow path is designed to prevent increase in pressure difference. To this end, the recycling flow path is formed to be sufficiently wide to maintain quite constant pressure throughout the recycling flow path except for surrounding of the nozzle 12b. As illustrated in FIGS. 1 and 2, thus, influence of suction force of the ejector 12a on the purge path 11 may be determined by a ratio of conventional purge pressure difference/purge pressure difference according to the present disclosure of 10% or more. Namely, when the ratio is more than 10%, suction force of the ejector 12a may be effectively used at the purge flow path 11. As a structure illustrated in FIG. 1 or 2, when the purge valve is disposed at a lower end of the stack manifold block and the supply line 13 supplying fuel to the stack is disposed at an upper end of the stack manifold block, "conventional purge pressure difference" may mean purge pressure difference formed in the stack manifold block. Further, as a structure illustrated in FIG. 4, when the purge valve and the supply line 13 supplying fuel to the stack are formed to be spaced within a certain distance, particularly, when the purge flow path 11 is formed at the upper end of the stack manifold block, a purge pressure difference according to the present disclosure may refer to a purge pressure difference formed in the stack manifold block.

Accordingly, the area where pressure is decreased by suction force of the ejector 12a while forming an inlet of the purge flow path 11 is referred to as the "low pressure area" in the present disclosure. According to the illustrated embodiment, when a distance between the nozzle 12b and the inlet of the purge flow path 11 is 40 mm, it may be shown that pressure in the low pressure area is decreased to 15 kPa at maximum output of 100 kW. It may be considered that pressure drop of 15 kPa is a total of pressure drop by suction force of the ejector 12a and a pressure drop by dynamic pressure according to a rapid flow speed of fluid at high output.

Meanwhile, hydrogen supplied to the stack in the fuel cell vehicle reacts at a membrane electrode assembly (MEA) in the stack. After reaction, gas may be discharged through the outlets of the anode and the cathode. Herein, anode off gas discharged through the outlet of the anode may be recycled to the stack using the ejector 12a or a recycling blower (a recycling pump).

In addition, in the case of operation of the fuel cell system, the concentration of fuel of the anode, namely, hydrogen, may be decreased by nitrogen diffused at the cathode. Thus, periodic purge may be necessary to maintain the concentration of hydrogen at a certain level or more. When purging, since a mixture of hydrogen and nitrogen discharged is discharged from the outlet of the cathode, the amount of discharged gas may depend on pressure of a hydrogen outlet, pressure difference of an air outlet, and opening time of the valve.

Further, upon operation of the fuel cell system, as output of the vehicle is increased, pressure of the cathode is generally increased. In response, the vehicle may be driven as pressure of the anode is increased. Additionally, as output of the fuel cell system is increased, the amount of gas, particularly, hydrogen and air, supplied to the stack may be increased. In a reaction of the stack, the amount of supplied air may be significantly larger than an amount of hydrogen, i.e., fuel. Considering that air contains about 21% oxygen and consumption of hydrogen upon reaction of the fuel cell is double the consumption of oxygen, the amount of supplied air may be maintained at 2.5 times higher than the consumption of hydrogen. Since consumption of air at the cathode is higher than consumption of fuel at the anode, when output of the fuel cell is increased, a pressure difference of the cathode is increased more rapidly than a pressure difference of the anode. In addition, the amount of purged gas depends on a difference of the pressure difference of the cathode and the pressure difference of the anode, and when the purge valve is opened, the amount of purged gas at the anode is significantly higher at high output than at low output.

When the purge valve is opened, the purge amount is maintained within a certain range and, as such, there are advantages in fuel efficiency of the entire fuel cell system and management of gas concentration. Thus, as a difference of the pressure difference of the anode and the pressure difference of the cathode is significantly increased at high output, purging the excessive amount of gas is a disadvantage of the fuel cell system.

Figure 3:
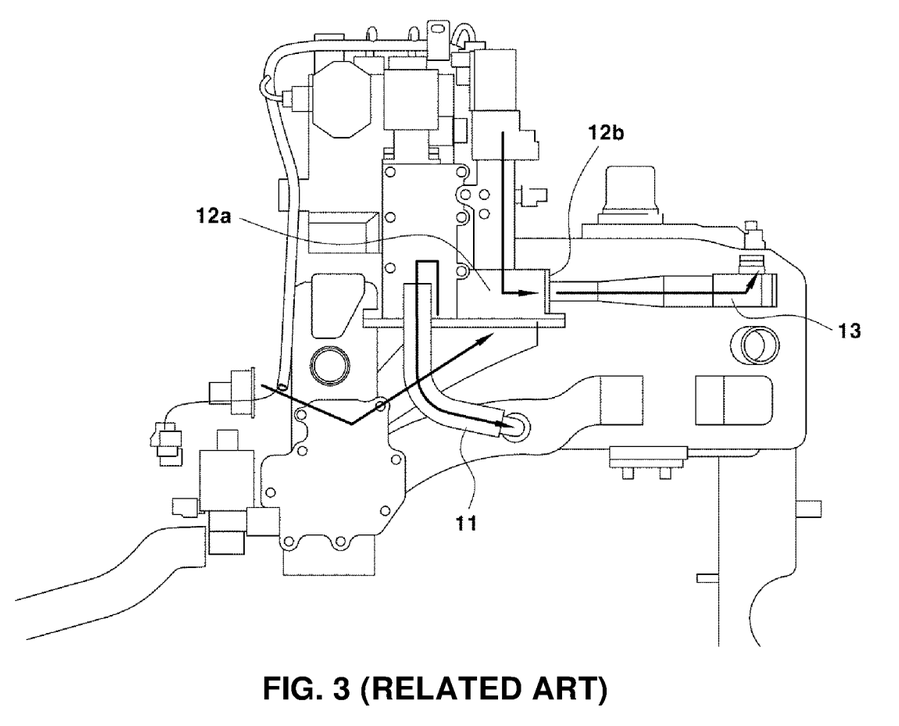
FIG. 3 (RELATED ART) is a view illustrating a recycling system of anode off gas according to another conventional case.

Meanwhile, FIGS. 2 and 3 are views illustrating the conventional anode off gas recycling system. Referring to FIGS. 2 and 3, the purge flow path 11 and the purge valve may be disposed at the lower end of the manifold of the stack, and the supply line 13 supplying hydrogen to the stack may be disposed at the upper end of the manifold of the stack. The purge flow path 11 may be adjacent to a water drain discharging water. Further, the supply line 13 supplying hydrogen to the stack may be formed to extend from the ejector 12a and the nozzle 12b of the ejector 12a.

Accordingly, in the conventional anode off gas recycling system, gas introduced to the stack manifold block after being discharged from the stack after being reacted at the anode may be purged by a difference of a pressure difference of the anode outlet and a pressure difference of the cathode outlet in the inner space. Since the outlet of the purge valve and a point where hydrogen is supplied to the stack are disposed at the upper and lower ends of the stack manifold, as illustrated in FIGS. 2 and 3, a distance therebetween is large. Thereby, it may be shown that a point at which the purge valve is disposed is not affected by suction force of the ejector 12a supplying hydrogen to the stack. Accordingly, as output of the fuel cell system is increased, purge pressure difference may be increased accordingly. In the conventional case, since the purge flow path 11 is formed to expand from the anode outlet through the stack manifold block, it may be shown the purge flow path 11 and the anode outlet are under the same pressure.

Figure 4:
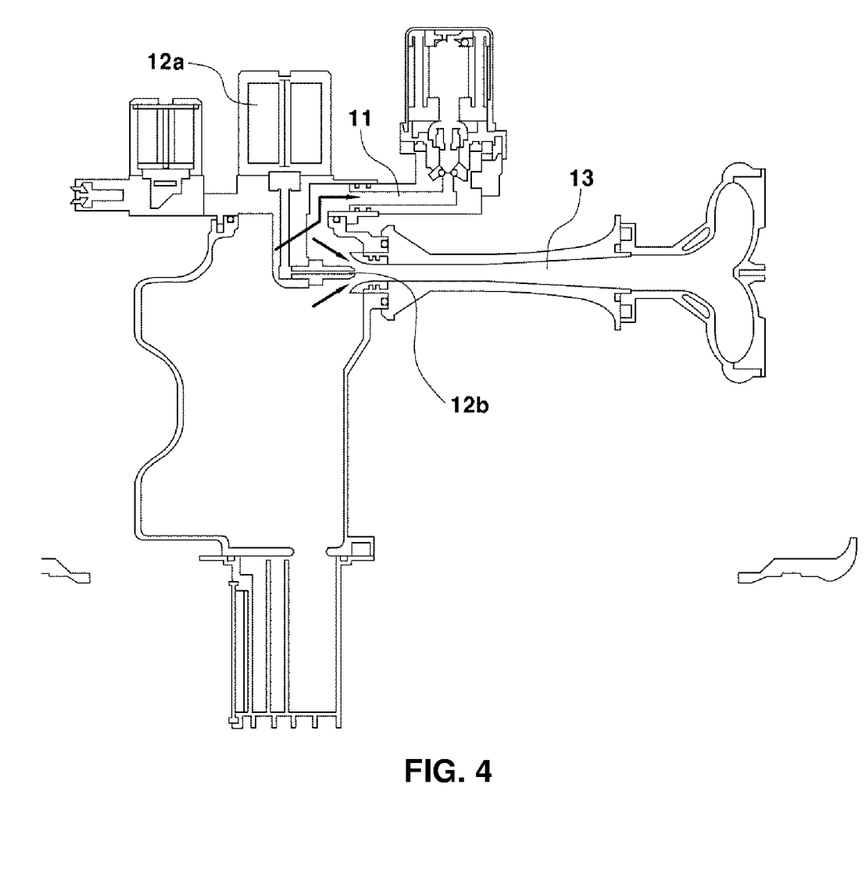
FIG. 4 is a view illustrating a recycling system of anode off gas including a purge flow path within a certain distance from a sprayer according to an embodiment of the present disclosure.

FIG. 4 is a view illustrating an embodiment of the present disclosure. As shown in FIG. 4, the inner space of the stack manifold block discharges gas from the anode outlet of the stack. The manifold block may include the anode outlet and a sprayer 12 spraying pure gas supplied from the fuel tank to the stack. In addition, the manifold block may include the purge flow path 11, the purge valve, and the water drain storing and discharging condensate. The ejector 12a including the nozzle 12b formed at the end of the ejector 12a in an extending direction from the ejector 12a to the stack may be used as an ejector of the illustrated embodiment of the present disclosure. The ejector 12a is part of a general configuration of the fuel cell system, and thus additional explanation thereof is omitted.

In the present disclosure, the purge flow path 11 may be formed within a certain distance from the sprayer 12. That is, the inlet of the purge flow path 11 may be disposed at the low pressure area formed by suction force of the ejector 12a. In addition, gas may be collected by the low pressure area formed by suction force of the ejector 12a, from the inner space of the stack manifold block to the low pressure area. Accordingly, a pressure difference of purge gas purged through the purge flow path 11 to the purge valve may be variable. Further, the amount of purged gas may be variable. In the above case, the purge pressure difference may depend on the distance from the nozzle 12b of the ejector 12a to the inlet of the purge flow path 11.

In the illustrated embodiment of the present disclosure, when the distance between the nozzle 12b of the ejector 12a and the inlet of the purge flow path 11 is large, a suction force of the ejector 12a is not affected. Thereby, suction force of the ejector 12a does not affect fluid flow going to the purge flow path 11, and as such, the purged amount may not be adjusted. Further, when the distance between the nozzle 12b of the ejector 12a and the inlet of the purge flow path 11 is small, the suction force of the ejector 12a is so strong that there is almost no purged amount. In the sprayer 12, namely, the nozzle 12b of the ejector 12a, the inlet of the purge flow path 11 may be formed within the circular area having a radius of 30 mm to 50 mm centered on the nozzle 12b. The inlet of the purge flow path 11 may be formed at a point of a circumference of a circle having a radius of 40 mm centered on the nozzle 12b.

Further, the purge flow path 11 may be disposed above the sprayer 12, more particularly, above a position at which the nozzle 12b of the ejector 12a is disposed. In addition, the flow path, namely, the supply line 13 and the purge flow path 11, for spraying gas from the nozzle 12b of the ejector 12a to the stack may be formed in parallel.

Meanwhile, anode off gas introduced to the inner space of the stack manifold block after being discharged from the anode outlet after reaction at the stack may move to the low pressure area, namely, an area adjacent to the purge flow path 11, by suction force of the ejector 12a. That is, the ejector 12a and the nozzle 12b may be disposed at a point on the path where anode off gas is discharged from the stack to the purge flow path 11. Anode off gas discharged from the stack may be guided to the low pressure area adjacent to the nozzle 12b of the ejector 12a. Some gas guided to the low pressure area may be purged through the purge flow path and the remaining gas is mixed with pure gas supplied by the sprayer 12 to be guided to the supply line 13, thereby being supplied to the stack. As a result, unnecessary purge of fuel may be prevented. Additionally, the amount of gas recycled to the stack may be increased, thereby increasing consumption efficiency of fuel.

Figure 5:
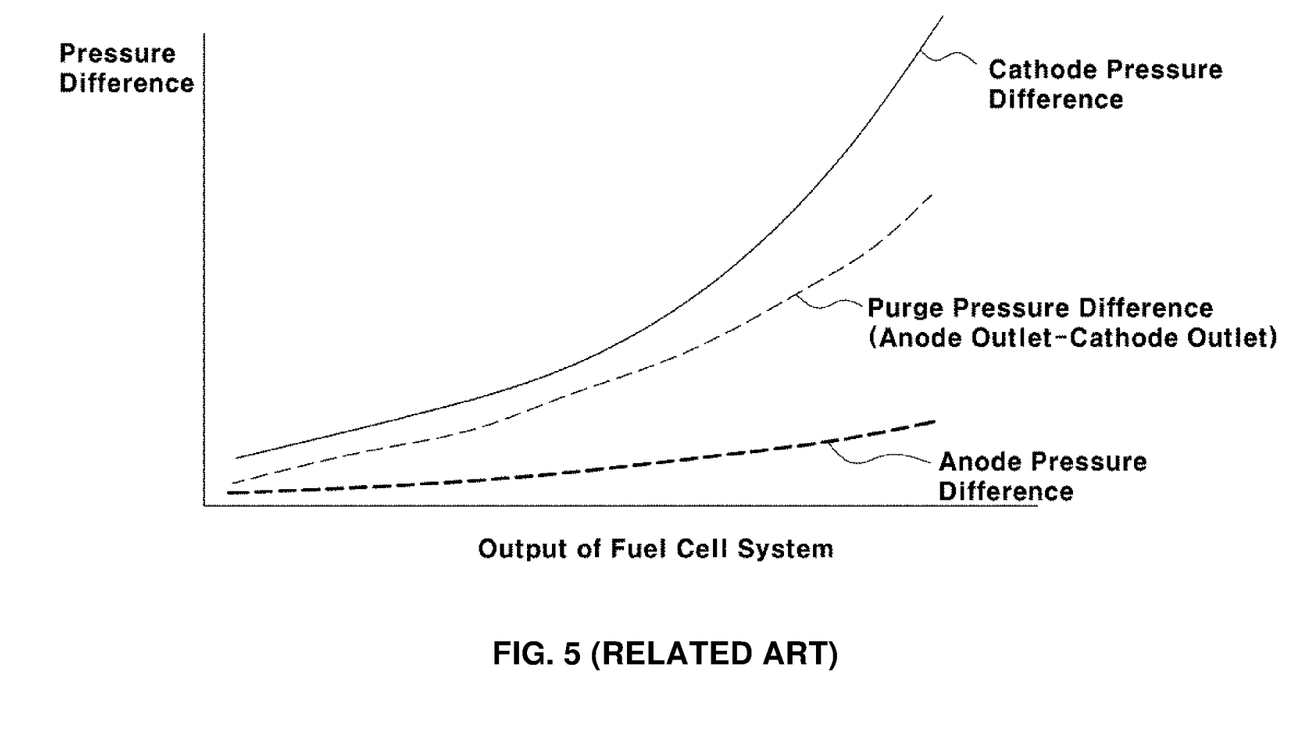
FIG. 5 (RELATED ART) is a graph illustrating anode pressure difference, cathode pressure difference, and purge pressure difference according to the conventional case.
Figure 6:
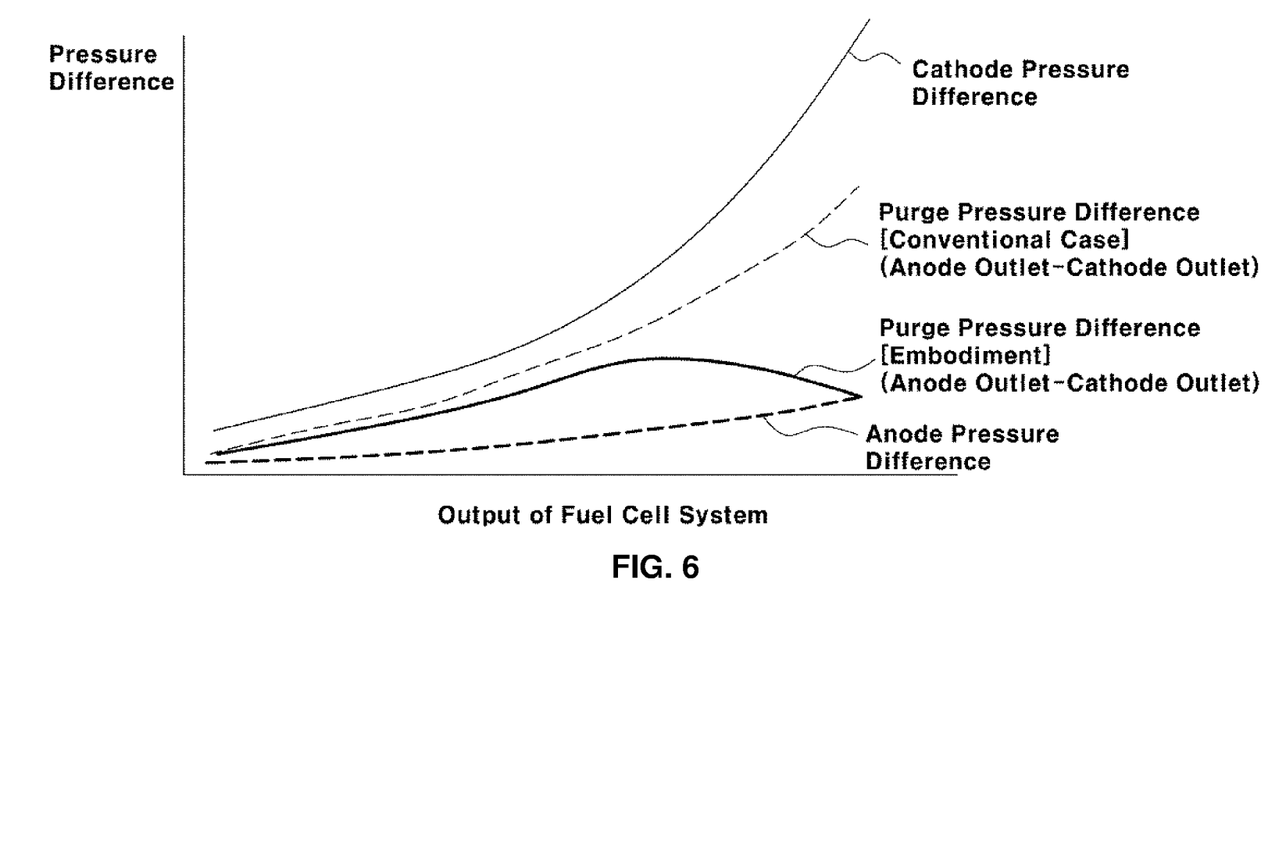
FIG. 6 is a view illustrating anode pressure difference, cathode pressure difference, and purge pressure difference according to the illustrated embodiment of the present disclosure.

FIGS. 5 and 6 are graphs illustrating a purge pressure difference according to output of the fuel cell system. FIG. 5 (RELATED ART) is a graph illustrating the conventional purge pressure difference. FIG. 6 is a graph comparing the conventional purge pressure difference and purge pressure difference according to the present disclosure.

FIGS. 5 and 6 show that the purge pressure difference of the anode and the purge pressure difference of the cathode are increased as output of the fuel cell system is increased. As described above, since air consumption at the cathode is greater than fuel consumption at the anode, the pressure difference of the cathode is significantly increased. Purge pressure difference means a value representing a difference between a pressure of the anode outlet and a pressure of the cathode outlet. Thus, in FIG. 5, the purge pressure difference is increased in proportion to output. Referring to FIG. 6, the purge flow path 11 may not have a pressure identical to the cathode outlet by suction force of the ejector 12a, and the purge pressure difference may be decreased in comparison with the conventional case. In addition, it may be shown that the purge pressure difference is not increased to a certain range or more although output of the fuel cell system is maximally increased. The purge pressure difference may be maintained within a certain range, thereby constantly adjusting the purge amount and preventing fuel, namely, hydrogen, from being discharged at high output.

Namely, in recycling the anode off gas to the stack, the purge flow path 11 may be formed within a certain distance from the fuel sprayer 12, namely, the ejector 12a and the nozzle 12b, and some anode off gas may be guided to the purge flow path 11 and the remaining anode off gas may be guided to the flow path connected to the stack, namely, the supply line 13.

As apparent from the above description, in accordance with the present disclosure, there are advantages as below.

The amount of hydrogen purged by a difference of the pressure of the anode outlet and the pressure of the cathode outlet may be constantly adjusted. Namely, since the purge difference pressure may be maintained at a constant level, the purge amount may be constantly adjusted. In spite of high output of the fuel cell, unnecessary purge of hydrogen having high concentration may be prevented. Accordingly, consumption efficiency of hydrogen of the fuel cell system may be improved.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A recycling system in which anode off gas of a fuel cell is recycled to a stack, comprising:
   a purge flow path purging the anode off gas passing through the stack; and
   an ejector spraying pure gas supplied from a fuel tank to the stack,
   wherein the ejector comprises a nozzle formed at an end of the ejector in a direction which extends toward the stack, and
   wherein the nozzle is disposed on a path where the anode off gas is discharged from the stack to the purge flow path, the purge flow path is spaced a certain distance from the ejector, and the anode off gas passing through the stack is mixed with the pure gas by suction force of the ejector to be introduced to the stack, thereby being recycled.

2. The recycling system of anode off gas according to claim 1, wherein the purge flow path is disposed above a position where the pure gas is sprayed from the ejector.

3. The recycling system of anode off gas according to claim 1, wherein the purge flow path is parallel to a supply line spraying the pure gas from the ejector to the stack.

4. The recycling system of anode off gas according to claim 1, wherein the certain distance is 20 mm to 60 mm.

* * * * *